United States Patent [19]

Ryan et al.

[11] Patent Number: 4,557,392

[45] Date of Patent: Dec. 10, 1985

[54] BABY BOTTLE WITH HANDLES

[76] Inventors: Kathryn A. Ryan; Gregory F. Ryan, both of 77 Erie St., Dumont, N.J. 07628

[21] Appl. No.: 610,256

[22] Filed: May 14, 1984

[51] Int. Cl.[4] .......................... A61J 9/00; F16K 21/00

[52] U.S. Cl. .............................. 215/11 R; 215/100 A; 220/94 A

[58] Field of Search ............................ 215/11 R–11 E, 215/1 R, 100 A; 220/94 A; D9/372; D24/47; 294/31.2, 27 H

[56] References Cited

U.S. PATENT DOCUMENTS

| | | | |
|---|---|---|---|
| 1,166,406 | 12/1915 | Baker | 215/11 R |
| 1,375,917 | 4/1921 | Paugh | 215/11 R |
| 2,586,199 | 2/1952 | Backus | 220/94 A |
| 3,145,867 | 8/1964 | Roberts et al. | 215/11 R |
| 3,441,160 | 4/1969 | Levy | 215/11 R |
| 3,718,360 | 2/1973 | Knutzen | 294/27 H |
| 3,990,596 | 11/1976 | Hoftman | 215/100 A X |

FOREIGN PATENT DOCUMENTS

| | | | |
|---|---|---|---|
| 143780 | 4/1949 | Australia | 215/1 R |

*Primary Examiner*—William Price
*Assistant Examiner*—Sue A. Weaver
*Attorney, Agent, or Firm*—Samuelson & Jacob

[57] ABSTRACT

A baby bottle having a longitudinally-extending side wall and diametrically opposite handles projecting laterally from the side wall of the bottle, the handles each including a hand-grip portion spaced from the side wall and a web portion spanning the space between the handgrip portion and the side wall to preclude catching of a baby's fingers between the handgrip portion and the side wall, the handles each making a small acute angle to the longitudinal direction of the side wall to aid in holding the bottle in the proper position for feeding.

7 Claims, 4 Drawing Figures

BABY BOTTLE WITH HANDLES

The present invention relates generally to baby bottles and pertains, more specifically, to a baby bottle having integral handles for assisting a baby in gripping the bottle so that the baby is encouraged to hold the bottle in appropriate position during feeding.

Baby bottles generally are constructed with a body having a tubular configuration of a diameter much too large for effective gripping by the small hands of a baby who will use the bottle for feeding. Usually, such bottles are manipulated by the baby grasping the bottle between the baby's hands, but each hand alone is not large enough to establish a firm grip on the bottle. As a result, the bottle often will elude the baby's grip and the baby will become discouraged from holding the bottle at an appropriate position for feeding.

The utilization of handles and other handgrip configurations in connection with bottles and other drinking vessels is notoriously old; however, to our knowledge no baby bottle has been constructed with handles having a specific contour and orientation best suited to encourage a baby to hold the bottle in appropriate position for feeding, with comfort, and without the potential for injury.

It is therefore an object of the present invention to provide a baby bottle with handles designed to encourage a baby to grip the bottle and to facilitate holding the bottle in the proper position for feeding.

Another object of the invention is to provide a baby bottle with handles having a contour and configuration enabling effective gripping by a baby's hands with comfort and without a potential for injury.

Still another object of the invention is to provide a baby bottle with handles oriented for appropriate positioning of the bottle by the baby for proper feeding.

Yet another object of the invention is to provide a baby bottle with handles integral with the bottle in a relatively simple construction which is inexpensive to manufacture in large quantities of consistent high quality.

The above objects, as well as further objects and advantages, are attained by the present invention which may be described briefly as an improvement in a baby bottle having a body with a tubular side wall extending longitudinally between a mouth at the top end thereof and a bottom wall at the bottom end thereof, the baby bottle having a central longitudinal axis, the improvement comprising: handles integral with the tubular side wall, the handles projecting laterally outwardly away from the longitudinal axis and having a length extending generally longitudinally along the body; each handle having a concave surface and a convex surface establishing a handgrip portion for a baby's hand, the handgrip portion being spaced laterally a distance from the side wall, and a web portion spanning the distance between the handgrip portion and the side wall for precluding catching of the fingers of the baby's hand between the handgrip portion and the side wall. The invention further contemplates that the handles extend at an acute angle to the longitudinal axis.

The invention will be understood more fully, while further objects and advantages will become apparent, in the following detailed description of an embodiment of the invention illustrated in the accompanying drawing, in which.

Figure 2:
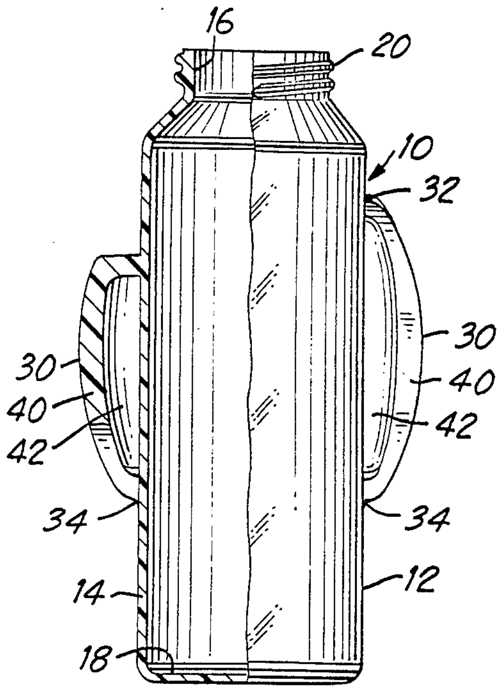
FIG. 2 is a front elevational view, partially in cross-section, of the baby bottle.
Figure 1:
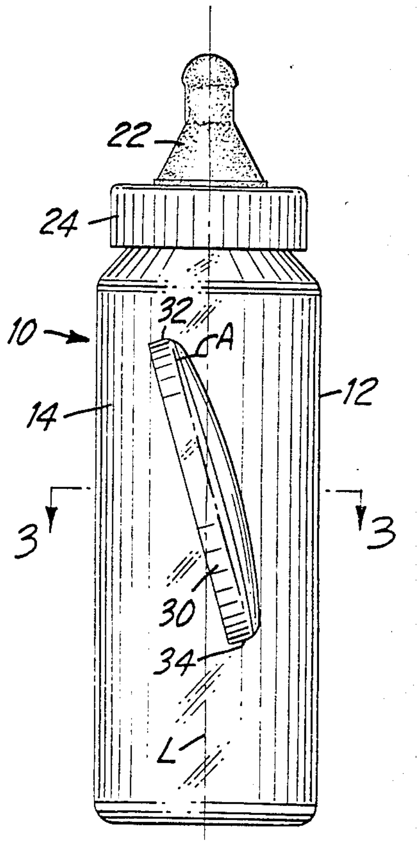
FIG. 1 is a side elevational view of a baby bottle constructed in accordance with the invention.

Referring now to the drawing, and especially to FIGS. 1 and 2 thereof, a baby bottle constructed in accordance with the invention is illustrated generally at 10 and is seen to have a body 12 including a generally tubular side wall 14 extending longitudinally, along a central longitudinal axis L, between a mouth 16 at the top end of the side wall 14 and a bottom wall 18 at the bottom end of the side wall 14. Body 12 carries a thread 20 at the mouth 16 to enable the selective coupling of a nipple 22 to the body 12 at the mouth 16, utilizing a threaded collar 24 in a now-conventional manner.

Baby bottle 10 is provided with handles 30 integral with tubular side wall 14 of the body 12 and projecting laterally outwardly at diametrically opposed locations on the body 12. Each handle 30 extends generally longitudinally between a first end 32, adjacent the mouth 16 of the bottle 10, and a second end 34, adjacent the bottom wall 18.

Figure 3:
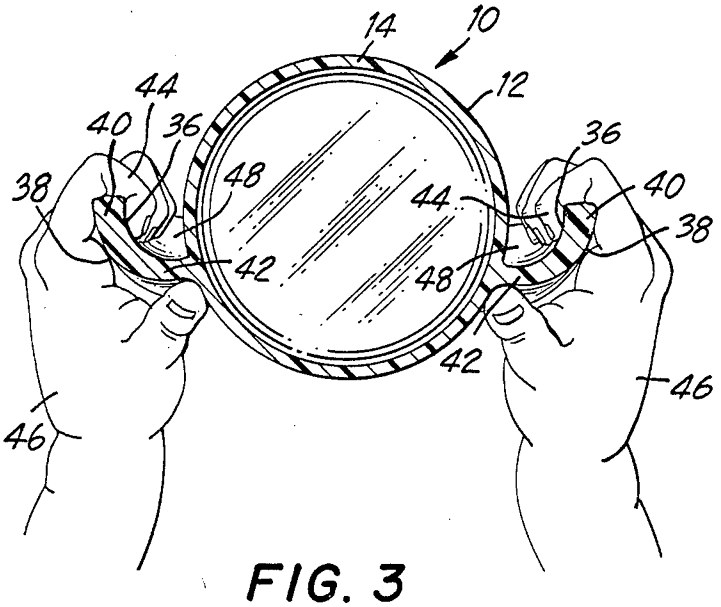
FIG. 3 is an enlarged lateral cross-sectional view taken along line 3—3 of FIG. 1.

Turning now to FIG. 3, as well as to FIGS. 1 and 2, each handle 30 has a concave surface 36 and a convex surface 38 establishing a handgrip portion 40 spaced from the side wall 14 and a web portion 42 spanning the space between the handgrip portion 40 and the side wall 14. The concave surfaces 36 of both handles 30 face the same direction, that is, upwardly as viewed in FIG. 3, so that the fingers 44 of a baby's hands 46 will be placed within a recess 48 formed between each handgrip portion 40 and the tubular wall 14, while remaining portions of the hands 46 will engage the convex surfaces 38 to establish a grip suited to the small hands 46 of the baby. The web portion 42 serves to preclude the fingers 44 from being wrapped completely around the handgrip portion 40 in such a way that the fingers 44 could become wedged between the handgrip portion 40 and the side wall 14, causing discomfort and potential injury to the baby's fingers 44. The handle configuration allows comfortable gripping coupled with easy release, whenever desired, without the hang-up which is possible where the fingers extend fully between a vessel and an attached gripping handle.

It is noted that handles 30 are generally lobe-shaped, as best seen in FIG. 2, with the handles 30 tapering towards both the first and second ends 32 and 34 and gradually faired into the side wall 14 so as to provide smooth continuous contours with no sharp edges or confining surfaces to injure or capture the baby's hands or fingers. Such a construction also precludes any accumulation of unwanted foreign matter and contributes to the ease of keeping the bottle 10 clean. In addition, the web portion 42 preferably has an unbroken, smooth contoured configuration extending continuously between the handgrip portion 40 and the side wall 14 for precluding injury and for ease in maintaining cleanliness. Handles 30 preferably are molded unitary with the side wall 14, the entire bottle 10 being economically molded of a synthetic resin material in a one-piece structure.

Figure 4:
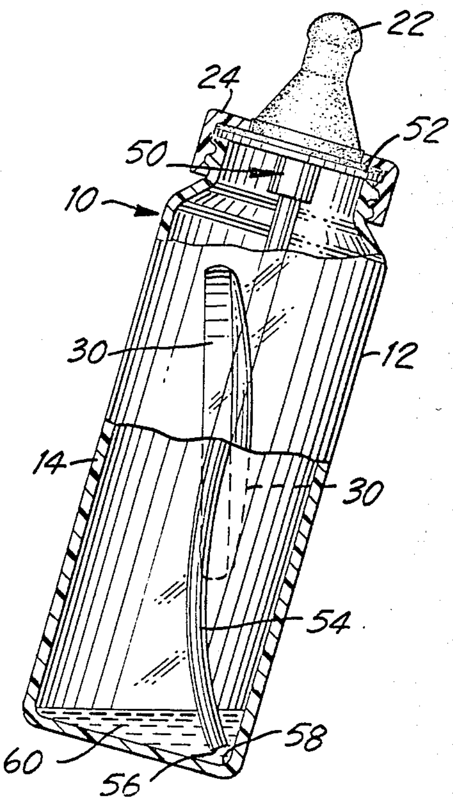
FIG. 4 is a side elevational view, partially sectioned and reduced in size, showing the baby bottle in use.

Referring now to FIG. 4, bottle 10 is shown provided with a dip-tube accessory 50, commonly used with baby bottles to enable feeding with the bottle in a more-orless upright orientation. Dip-tube accessory 50 includes a flange 52, clamped beneath the nipple 22, and a depending dip-tube 54 extending downwardly from the flange 52 to extend into the contents of the bottle 10. In this manner, the baby may draw liquid from the bottle 10 while the baby is in a sitting position, holding the bottle 10 in a generally upright orientation, but tilted slightly from the vertical position to facilitate entry of the nipple 22 into the baby's mouth. The dip-tube 54 is curved so as to place the entrance end 56 of the dip-tube 54 at the corner 58 between the side wall 14 and bottom wall 18 of the body 12 of bottle 10. By placing the entrance end 56 of the dip-tube 54 within corner 58, the bottle 10 may be tilted, as shown in FIG. 4, and it will be assured that the maximum amount of the liquid 60 in the bottle 10 will be available to the dip-tube 54.

In order to facilitate placement of the bottle 10 at the tilted orientation illustrated in FIG. 4, handles 30 extend at an acute angle A relative to the longitudinal axis L of the body 12 of the bottle 10, as seen in FIG. 1. When the baby is in the sitting position and holds the bottle 10 in position for feeding, the tendency is for the baby to arrange his hands so that the handles 30 will extend generally vertically. With the handles 30 located at acute angle A, such vertical placement of the handles 30 will result in the bottle being tilted relative to the vertical direction, at the angle illustrated in FIG. 4, thereby attaining the desired placement of the nipple 22 for feeding, while the liquid 60 is drained toward the corner 58 where the liquid 60 can enter the entrance end 56 of the dip-tube 54. Angle A preferably is about six to ten degrees, but can extend beyond ten degrees and still accomplish the desired results. Thus, each handle 30 extends at the same angle relative to longitudinal axis L, and bottle 10 is tilted without requiring that the baby move his hands to any position other than the comfortable, natural position where the hands ordinarily will fall. It is noted that the tilt of the handles 30 is such that the concave surfaces 36 are oriented toward confrontation with the bottom end of the tubular side wall 14 diametrically opposite corner 58 so that the baby's hands 46 will be placed in proper registration with the handles 30 to achieve the above result.

It will be seen that the construction and location of the handles 30 on the bottle 10 will encourage a baby to grasp the bottle 10 and hold the bottle 10 in proper orientation for feeding, with minimal effort and maximum comfort and effectiveness.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. In a baby bottle having a body with a tubular side wall extending longitudinally between a mouth at the top end thereof and a bottom wall at the bottom end thereof, the bottom wall intersecting the side wall at a corner, the baby bottle having a central longitudinal axis, the mouth being adapted to receive a nipple and a dip-tube accessory including a dip-tube having an entrance end to be located at said corner when the dip-tube accessory is in place at the mouth of the baby bottle to assist in draining the contents of the bottle, the improvement comprising:

at least two handles integral with the tubular side wall, the handles projecting laterally outwardly in generally opposite directions from the longitudinal axis, the handles each having opposite first and second ends and a length extending generally longitudinally along the body, between said opposite first and second ends;

each handle being tapered toward each of the opposite ends and gradually faired into said side wall, the handles each having a concave surface and a convex surface establishing a handgrip portion for a baby's hand, the handgrip portion being spaced laterally a distance from the side wall, and a web portion spanning the distance between the handgrip portion and the side wall for precluding catching of the fingers of the baby's hand between the handgrip portion and the side wall, the web portion of each handle including smooth continuous surfaces contiguous with the side wall and the handgrip portion of that handle, each web portion extending continuously between the handgrip portion and the side wall throughout the length of the corresponding handle;

the handles each extending at an acute angle to the longitudinal axis, with the concave surface tilted toward confrontation with the bottom end of the side wall diametrically opposite said corner, such that upon orientation of the handles in a vertical direction the central longitudinal axis of the body bottle will be tilted at said acute angle to tilt the nipple at said acute angle and to direct the contents of the baby bottle toward the entrance end of the dip-tube located at said corner.

2. The invention of claim 1 wherein the number of handles is two and the handles are located diametrically opposite one another.

3. The invention of claim 2 wherein the handles are unitary with the side wall.

4. The invention of claim 1 wherein the acute angle is about six to ten degrees.

5. The invention of claim 4 wherein the number of handles is two and the handles are located diametrically opposite one another.

6. The invention of claim 5 wherein the handles are unitary with the side wall.

7. The invention of claim 4 wherein the handles are unitary with the side wall.

* * * * *